United States Patent
Zhou et al.

(10) Patent No.: US 10,015,701 B2
(45) Date of Patent: Jul. 3, 2018

(54) MULTIMODE DUAL-PATH TERMINAL

(71) Applicant: ZTE Corporation, Shenzhen, Guangdong (CN)

(72) Inventors: Zhenglin Zhou, Shenzhen (CN); Kezhong Ding, Shenzhen (CN); Yibin Zhai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 125 days.

(21) Appl. No.: 15/123,338

(22) PCT Filed: Jun. 4, 2014

(86) PCT No.: PCT/CN2014/079181
§ 371 (c)(1),
(2) Date: Sep. 2, 2016

(87) PCT Pub. No.: WO2015/131456
PCT Pub. Date: Sep. 11, 2015

(65) Prior Publication Data
US 2017/0070918 A1    Mar. 9, 2017

(30) Foreign Application Priority Data

Mar. 3, 2014  (CN) .......................... 2014 1 0075232

(51) Int. Cl.
*H04W 36/00* (2009.01)
*H04B 1/00* (2006.01)
(Continued)

(52) U.S. Cl.
CPC ...... *H04W 36/0022* (2013.01); *H04B 1/0064* (2013.01); *H04B 1/406* (2013.01);
(Continued)

(58) Field of Classification Search
CPC . H04W 36/0022; H04W 24/10; H04W 88/06; H04B 1/525; H04B 1/406; H04B 1/0064
See application file for complete search history.

(56) References Cited

U.S. PATENT DOCUMENTS

2010/0093282 A1* 4/2010 Martikkala ............ H04B 17/14
455/63.4
2010/0157858 A1* 6/2010 Lee .......................... H01Q 9/40
370/297

(Continued)

FOREIGN PATENT DOCUMENTS

CN    101094480 A    12/2007
CN    102170644 A     8/2011
(Continued)

OTHER PUBLICATIONS

International Search Report in international application No. PCT/CN2014/079181, dated Dec. 8, 2014, 5 pgs.
(Continued)

*Primary Examiner* — Thai Nguyen
(74) *Attorney, Agent, or Firm* — Cooper Legal Group, LLC

(57) ABSTRACT

Disclosed is a multimode dual-path terminal, comprising an antenna, a first radio-frequency transceiving module which supports the receiving and transmitting of a radio-frequency signal of the first communication model, a second radio-frequency transceiving module which supports the receiving and transmitting of a radio-frequency signal of the second communication model, a first radio-frequency switch, a second radio-frequency switch, a third radio-frequency switch and a fourth radio-frequency switch, wherein the first path of a high-band transceiving path of the first radio-frequency transceiving module is connected to the antenna via the first radio-frequency switch, and the first path of a low-band transceiving path of the first radio-frequency
(Continued)

transceiving module is connected to the antenna via the second radio-frequency switch; and a high-band transceiving path of the second radio-frequency transceiving module is connected to the antenna via the third radio-frequency switch, and a low-band transceiving path of the second radio-frequency transceiving module is connected to the antenna via the fourth radio-frequency switch.

10 Claims, 7 Drawing Sheets

(51) Int. Cl.
    *H04B 1/403*     (2015.01)
    *H04B 1/525*     (2015.01)
    *H04W 24/10*     (2009.01)
    *H04W 88/06*     (2009.01)

(52) U.S. Cl.
    CPC ............ *H04B 1/525* (2013.01); *H04W 24/10* (2013.01); *H04W 88/06* (2013.01)

(56) References Cited

U.S. PATENT DOCUMENTS

| | | | |
|---|---|---|---|
| 2014/0003300 A1 | 1/2014 | Weissman et al. | |
| 2014/0105079 A1* | 4/2014 | Bengtsson | H04B 1/005 370/297 |
| 2015/0327329 A1 | 11/2015 | Zhou | |

FOREIGN PATENT DOCUMENTS

| | | |
|---|---|---|
| CN | 102378395 A | 3/2012 |
| CN | 102404021 A | 4/2012 |
| WO | 2013189397 A2 | 12/2013 |

OTHER PUBLICATIONS

English Translation of the Written Opinion of the International Search Authority in international application No. PCT/CN2014/079181, dated Dec. 8, 2014, 9 pgs.

Supplementary European Search Report in international application No. 14884535.7, dated Mar. 7, 2017, 5 pgs.

* cited by examiner

MULTIMODE DUAL-PATH TERMINAL

TECHNICAL FIELD

The disclosure relates to the field of communications, and in particular to a multimode dual-active terminal.

BACKGROUND

A multimode dual-standby dual-active terminal of Long Term Evolution (LTE) and Global System for Mobile communication (GSM) can provide users with a mobile voice call service and a high-speed data service. The voice is transmitted by means of a GSM network, and the data is transmitted by means of an LTE network.

In the related art, a dual-radio-frequency solution can solve data service interruption, switching or suspending caused by the Circuit Switched Fallback (CSFB) technology. Furthermore, the technical complexity of the dual-radio-frequency solution is relatively low, so the dual-radio-frequency solution is a selectable solution for the early development of voice service of the LTE.

FIG. 1 is a traditional architecture diagram of using a radio-frequency dual-chip to implement an LTE/UMTS/GSM multimode dual-active terminal. As shown in FIG. 1, the LTE/GSM multimode dual-active terminal is mainly composed of a digital baseband chip, an LTE radio-frequency module, a GSM radio-frequency module, and a power management chip. The LTE radio-frequency module uses two antennae, one of which is used as a primary channel for reception and transmission, and the other is used as a secondary channel for reception. The GSM radio-frequency module is composed of an antenna; the GSM900 and the DCS1800 share an antenna.

In the multimode terminal shown in FIG. 1, the interference between transmission at GSM900 band and reception at Band 41 band is shown in FIG. 2. A GSM900 transmission signal is mainly composed of a GSM900 useful signal, each harmonic signal of a transmission signal, and a broadband white noise of the transmission signal. The GSM900 third harmonic (2640 MHz-2745 MHz) is partly in the Band 7/41 reception band.

In the multimode terminal shown in FIG. 1, the traditional interference between transmission at GSM900 band and reception at Band 41 band is shown in FIG. 3. There is a GSM900 useful signal, the second harmonic, and the third harmonic (2640 MHz-2745 MHz) at a GSM transmission port A. At the point A, the power of the useful signal is 33 dBm, and the third-harmonic intensity is about −50 dBm. If the isolation between a GSM antenna and an LTE antenna is about −15 dB, the power of the GSM useful signal received at an LTE reception port B is about 18 dBm, and the GSM third-harmonic intensity is about −65 dBm. The third harmonic of an LTE antenna switch is about 85 dBc, and an in-band insertion loss is about 1 dB; after the GSM useful signal passes the switch, the third harmonic generated at the point C is about −67 dBm, the total third harmonic of the GSM useful signal at the point C is about −63.5 dBm, and the power of the GSM useful signal is about 17 dBm. The insertion loss of a Band 41 filter is about 3 dB, the insertion loss near 900 MHz is about 45 dB, the power of the useful signal of the GSM band which is received at the Band 41 reception port D of the LTE chip is about −28 dBm, and the third harmonic of the GSM band is about −70 dBm. The Band 41 reception port will be interfered by the signal in the GSM band and its third harmonic.

To sum up, in the existing dual-radio-frequency solution, a signal transmitted by a module will interfere reception of signals by another module.

There is yet no effective solution for addressing the problem in the related art that two communication modules in a multimode dual-standby dual-active terminal will interfere with each other.

SUMMARY

For at least solving the problem that two communication modules of different communication modes in a multimode dual-active terminal will interfere with each other, the disclosure provides a multimode dual-active terminal.

According to the disclosure, there is provided a multimode dual-active terminal, including: an antenna group, a first radio-frequency transceiver module which supports reception and transmission of a radio-frequency signal of the first communication mode, a second radio-frequency transceiver module which supports reception and transmission of a radio-frequency signal of a second communication mode, a first radio-frequency switch, a second radio-frequency switch, a third radio-frequency switch, and a fourth radio-frequency switch, herein a high-band transceiving path of a first channel of the first radio-frequency transceiver module is connected with the antenna group via the first radio-frequency switch, a low-band transceiving path of the first channel of the first radio-frequency transceiver module is connected with the antenna group via the second radio-frequency switch; a high-band transceiving path of the second radio-frequency transceiver module is connected with the antenna group via the third radio-frequency switch, and a low-band transceiving path of the second radio-frequency transceiver module is connected with the antenna group via the fourth radio-frequency switch.

In an embodiment, the antenna group may include: a first antenna and a second antenna; the multimode dual-active terminal may further include: a first diplexer and a second diplexer; herein, a common interface of the first radio-frequency switch is connected with a high-pass interface of the first diplexer, a common interface of the second radio-frequency switch is connected with a low-pass interface of the first diplexer, and a common interface of the first diplexer is connected with the first antenna; a common interface of the third radio-frequency switch is connected with a high-pass interface of the second diplexer, a common interface of the fourth radio-frequency switch is connected with a low-pass interface of the second diplexer, and a common interface of the second diplexer is connected with the second antenna.

In an embodiment, the multimode dual-active terminal may further include: a fifth radio-frequency switch and a sixth radio-frequency switch, herein a high-band transceiving path of a second channel of the first radio-frequency transceiver module is connected with the antenna group via the fifth radio-frequency switch, and a low-band transceiving path of the second channel of the first radio-frequency transceiver module is connected with the antenna group via the sixth radio-frequency switch.

In an embodiment, the antenna group may further include: a third antenna; the multimode dual-active terminal further includes: a third diplexer, herein a common interface of the fifth radio-frequency switch is connected with a high-pass interface of the third diplexer, a common interface of the sixth radio-frequency switch is connected with a low-pass interface of the third diplexer, and a common interface of the third diplexer is connected with the third antenna.

In an embodiment, the first communication mode may be an LTE communication mode, and the second communication mode may be a GSM communication mode.

In an embodiment, the first path may be a primary channel, and the second path may be a secondary channel.

In an embodiment, the frequency bands supported by the second radio-frequency transceiver module may include: GSM900 and Digital Cellular System (DCS) 1800.

By means of the disclosure, in a front architecture of the multimode terminal, paths of respective bands of each mode are classified according to the high and low bands; the low-band paths of each mode share a radio-frequency switch, and the high-band paths share a radio-frequency switch, so that the interference between the communication modules of different communication modes is reduced.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form an improper limit to the disclosure. In the accompanying drawings.

DETAILED DESCRIPTION

The disclosure is described below with reference to the accompanying drawings and embodiments in detail. It is important to note that the embodiments of the disclosure and the characteristics in the embodiments can be combined under the condition of no conflicts.

Aiming at the problem in the related art that communication modules of different communication modes in a multimode dual-active terminal will interfere with each other, the disclosure provides an improved technical solution. In embodiments of the disclosure, the front architecture of two dual-active communication modules is improved. In embodiments of the disclosure, paths of respective bands of a radio-frequency transceiver module in two dual-active modules of the multimode dual-active terminal are classified according to the high and low bands; the low-band paths share a radio-frequency switch, and the high-band paths share a radio-frequency switch. The technical solution in the related art that paths of all bands of each radio-frequency transceiver module share a radio-frequency switch is not adopted.

Figure 1:
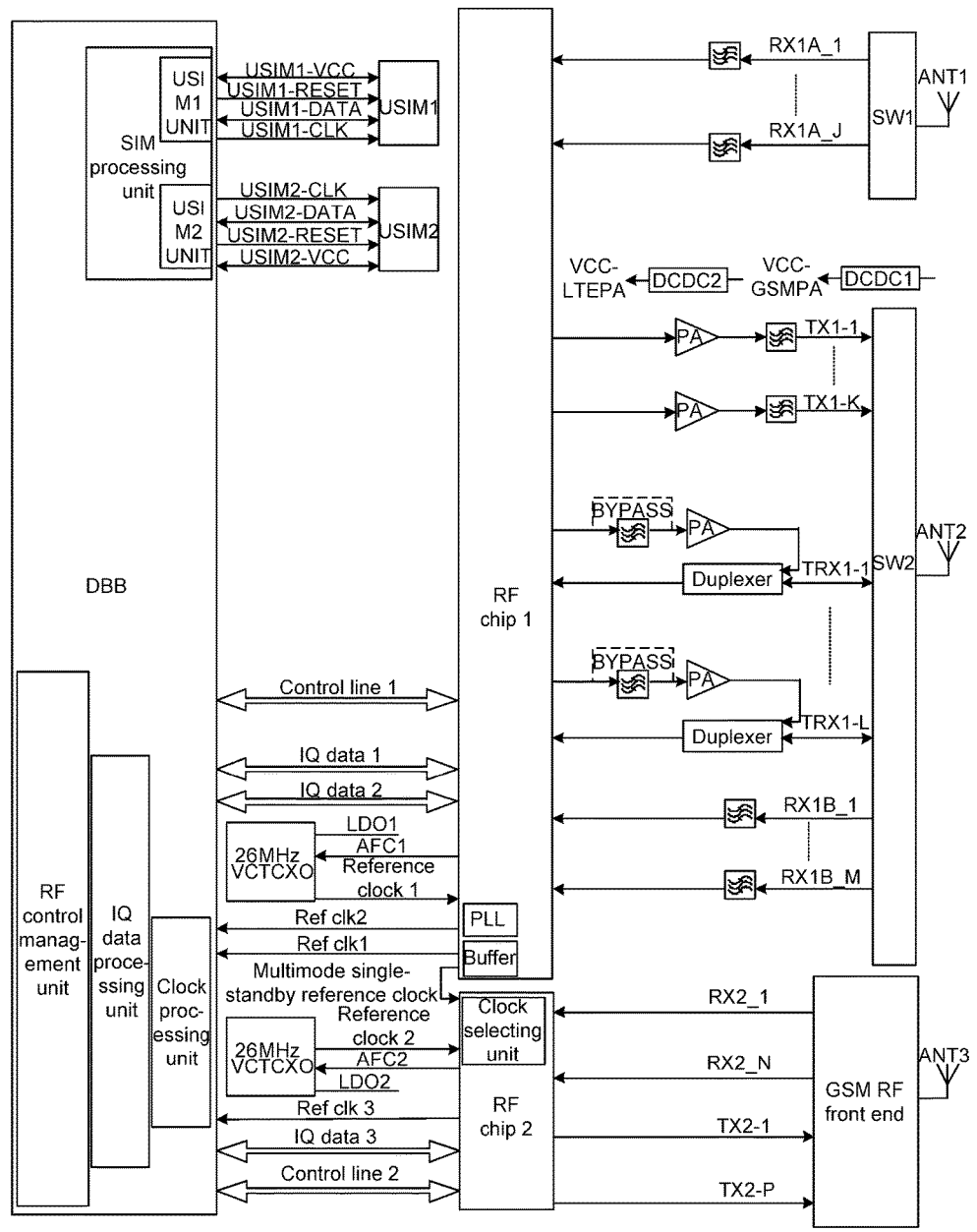
FIG. 1 is an architecture diagram of using a radio-frequency dual-chip to implement an LTE/UMTS/GSM multimode dual-active terminal according to the related art.
Figure 2:
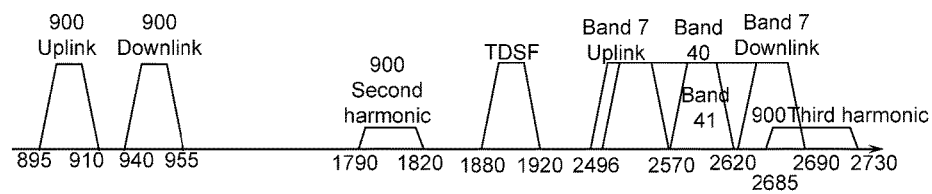
FIG. 2 is a schematic diagram of interference between transmission at GSM900 band and reception at Band 41 band in the related art.
Figure 3:
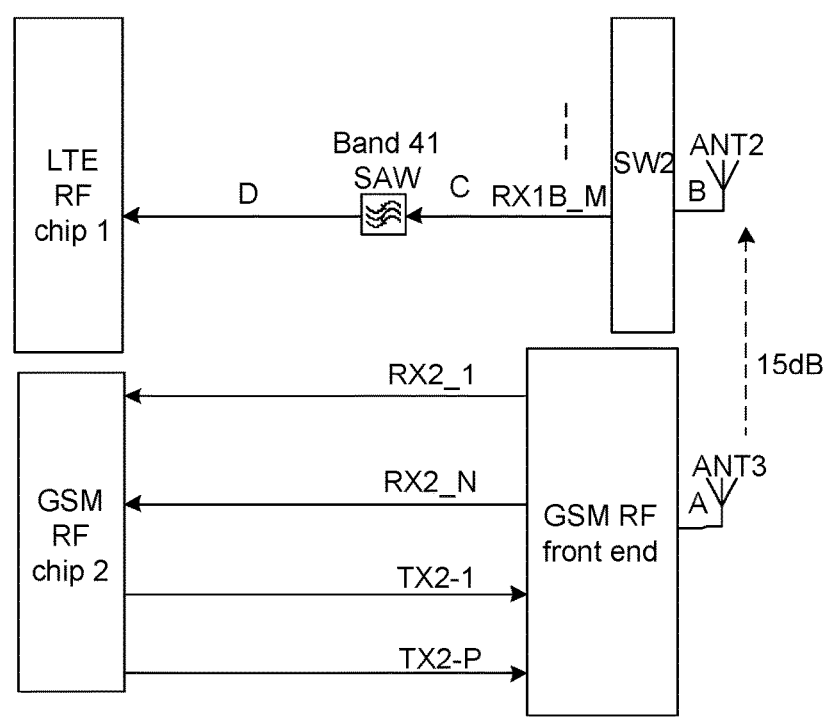
FIG. 3 is a schematic diagram of interference between transmission at GSM900 band and reception at Band 41 band in the related art.
Figure 4:
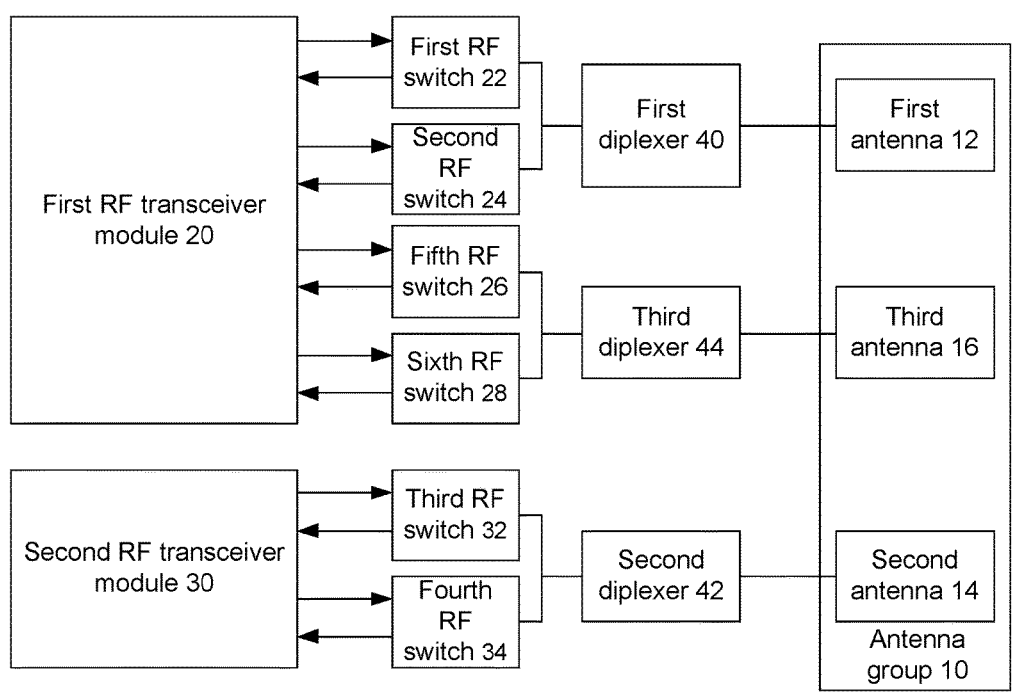
FIG. 4 is a structure diagram of a multimode dual-active terminal according to an embodiment of the disclosure.

FIG. 4 is a structure diagram of a multimode dual-active terminal according to an embodiment of the disclosure. To facilitate the description, only the front architecture of the multimode dual-active terminal is shown in the structure diagram, and other parts, such as a Power Management Unit (PMU) and a digital baseband chip, in the multimode dual-active terminal are not shown. Besides, some detailed parts, involving the improvement made by the disclosure, of the front architecture of the multimode dual-active terminal are not shown either. These parts which are not shown adopt the structure of the existing multimode dual-active terminal.

As shown in FIG. 4, the multimode dual-active terminal provided by the disclosure at least includes: an antenna group 10, a first radio-frequency transceiver module 20 which supports reception and transmission of a radio-frequency signal of a first communication mode, a second radio-frequency transceiver module 30 which supports reception and transmission of a radio-frequency signal of a second communication mode, a first radio-frequency switch 22, a second radio-frequency switch 24, a third radio-frequency switch 32, and a fourth radio-frequency switch 34, herein a high-band transceiving path of a first channel of the first radio-frequency transceiver module 20 is connected with the antenna group 10 via the first radio-frequency switch 22, a low-band transceiving path of the first channel of the first radio-frequency transceiver module 20 is connected with the antenna group 10 via the second radio-frequency switch 24; a high-band transceiving path of the second radio-frequency transceiver module 30 is connected with the antenna group 10 via the third radio-frequency switch 32, and a low-band transceiving path of the second radio-frequency transceiver module 30 is connected with the antenna group 10 via the fourth radio-frequency switch 34.

In the multimode dual-active terminal provided by the disclosure, transceiving paths of respective bands of the radio-frequency transceiver module corresponding to two dual-active communication modules are classified according to the high and low bands; the low-band transceiving paths share a radio-frequency switch to implement switching between reception and transmission, and the high-band transceiving paths share a radio-frequency switch to implement switching between reception and transmission, so that the interference between the communication modules can be reduced.

In an alternative embodiment, to reduce the number of antennae in the multimode dual-active terminal, a diplexer can be used for connecting two radio-frequency switches of the same radio-frequency transceiver module. As shown in FIG. 4, in the alternative embodiment, the antenna group 10 include: a first antenna 12 and a second antenna 14. The multimode dual-active terminal may further include: a first diplexer 40 and a second diplexer 42. As shown in FIG. 4, a common interface of the first radio-frequency switch 22 is connected with a high-pass interface of the first diplexer 40, a common interface of the second radio-frequency switch 24 is connected with a low-pass interface of the first diplexer 40, and a common interface of the first diplexer 40 is connected with the first antenna 12; a common interface of the third radio-frequency switch 32 is connected with a high-pass interface of the second diplexer 42, a common interface of the fourth radio-frequency switch 34 is connected with a low-pass interface of the second diplexer 42, and a common interface of the second diplexer 42 is connected with the second antenna 14. By means of the alternative embodiment, the number of antennae arrayed in the multimode dual-active terminal can be reduced, and the complexity of the multimode dual-active terminal can be reduced.

The diplexer in the disclosure has two paths, one of which has a high-pass filtering function, and the other has a low-pass filtering function. There is a low insertion loss in a high-pass path band, which has very high out-of-band rejection to low frequency; and there is a low insertion loss in a low-pass path band, which has very high out-of-band rejection to high frequency.

In a specific implementation process, the first radio-frequency transceiver module 20 may have two channels, namely a primary channel and a secondary channel; in the disclosure, both of them can adopt the above way, that is, band transceiving paths of each band are classified into a high-band transceiving path and a low-band transceiving path which respectively use a radio-frequency switch to implement switching between reception and transmission. So, in an alternative embodiment, as shown in FIG. 4, the multimode dual-active terminal may further include: a fifth radio-frequency switch 26 and a sixth radio-frequency switch 28, herein a high-band transceiving path of a second channel of the first radio-frequency transceiver module 20 is connected with the antenna group 10 via the fifth radio-frequency switch 26, and a low-band transceiving path of the second channel of the first radio-frequency transceiver module 20 is connected with the antenna group 10 via the sixth radio-frequency switch 28.

Further, the fifth radio-frequency switch 26 and the sixth radio-frequency switch 28 can be connected to a same antenna via a diplexer. As shown in FIG. 4, the multimode dual-active terminal may further include: a third diplexer 44; the antenna group 10 may further include: a third antenna 16. As shown in FIG. 4, a common interface of the fifth radio-frequency switch 26 is connected with a high-pass interface of the third diplexer 44, a common interface of the sixth radio-frequency switch 28 is connected with a low-pass interface of the third diplexer 44, and a common interface of the third diplexer 44 is connected with the third antenna 16.

Optionally, the first communication mode can be a LTE communication mode, and the second communication mode can be a GSM communication mode. Then, the first path can be the primary channel, and the second path can be the secondary channel. Of course, being not limited to that, in a practical application, the first communication mode and the second communication mode can further be other communication modes like CDMA.

Optionally, the bands supported by the GSM communication mode may include: the GSM900 (namely a low band) and the DCS1800 (namely a high band).

To further understand the technical solution provided by the disclosure, an illustration is given below by taking an LTE/GSM multimode dual-standby dual-active terminal for example.

Figure 5:
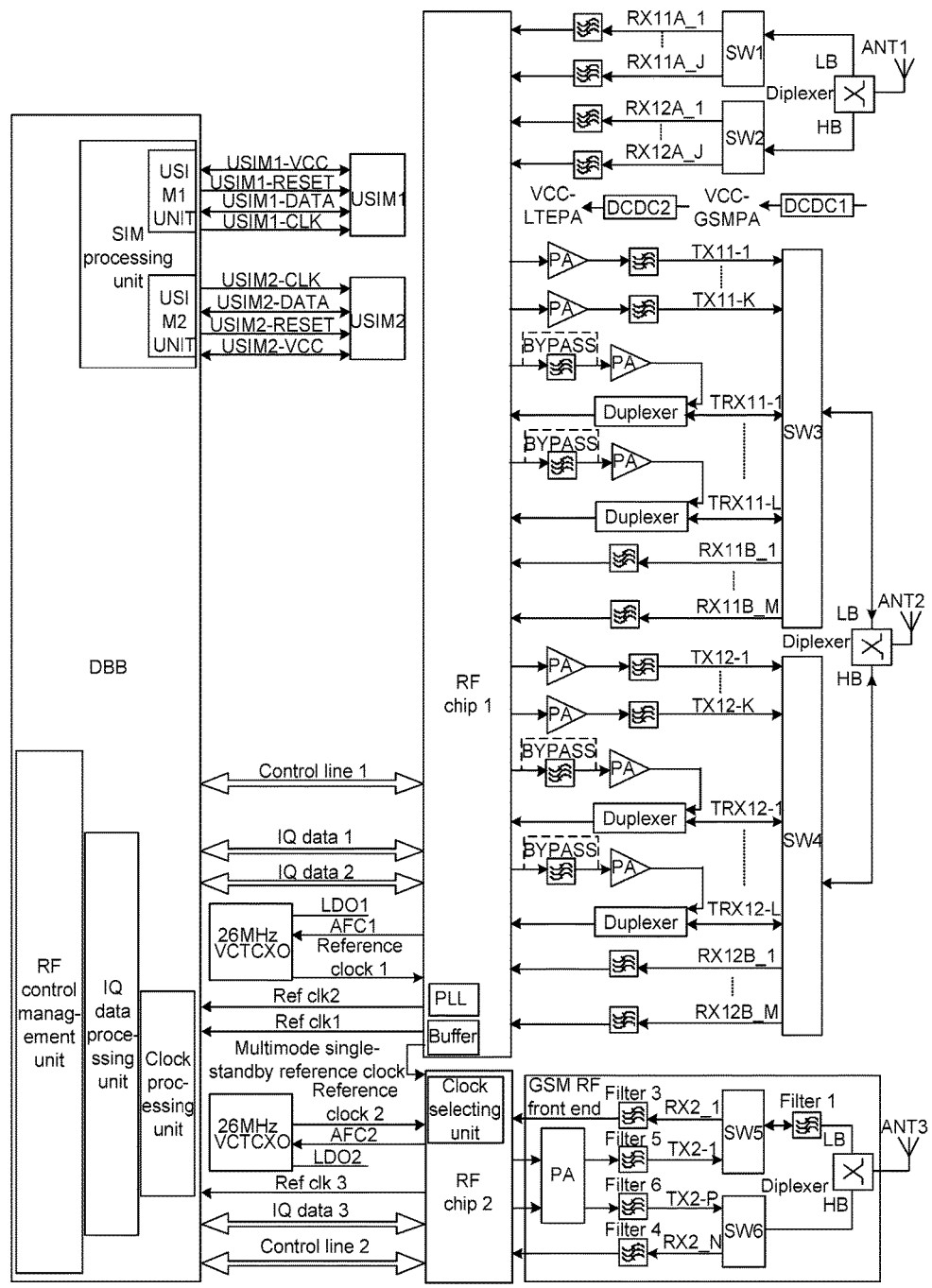
FIG. 5 is an architecture diagram of using a radio-frequency dual-chip to implement an LTE/UMTS/GSM multimode dual-active terminal according to an embodiment of the disclosure.

FIG. 5 is an architecture diagram of using a radio-frequency dual-chip to implement an LTE/UMTS/GSM multimode dual-active terminal according to an embodiment of the disclosure. As shown in FIG. 5, the LTE/UMTS/GSM multimode dual-active terminal which adopts the technical solution provided by the disclosure and is implemented by means of the radio-frequency dual-chip includes, but is not limited to:

a Power Management (PMU), which provides system power supply;

a digital baseband chip, which is used for receiving and transmitting an I/Q signal in the LTE and GSM modes, and providing system control; and two radio-frequency transceiver modules, one of which is the LTE radio-frequency transceiver module at least supporting reception and transmission of an LTE radio-frequency signal, and the other is the GSM radio-frequency transceiver module supporting reception and transmission of a GSM radio-frequency signal.

The LTE radio-frequency transceiver module includes, but is not limited to: a transceiver chip (namely a radio-frequency chip 1 in FIG. 5 in which a clock Buffer and a Phase Locked Loop (PLL) are included) which at least supports reception and transmission of the LTE radio-frequency signal, one or more power amplifiers which amplify signals of respective bands, one or more band-pass filters which are set behind the power amplifier and filter an out-of-band spurious signal, one or more saw filters which are set at a reception end of the radio-frequency transceiver chip and filter the out-of-band spurious signal, a number of duplexers which perform frequency division multiplexing, two sets of radio-frequency switches (one of which is used for band switching of a reception path 1 of the LTE secondary channel, and the other is used for band switching of the LTE primary channel, and each set includes two radio-frequency switches), two diplexers (one of which is used for band synthesis of the reception path of the LTE secondary channel, and the other is used for band synthesis of the LTE primary channel), and two radio-frequency antennae (one of which is used for receiving signals of the LTE secondary channel, and the other is used for receiving and transmitting signals of the LTE primary channel).

The GSM radio-frequency transceiver module includes, but is not limited to: a radio-frequency transceiver chip (namely a radio-frequency chip 2 in FIG. 5 in which a clock Buffer and a PLL are included) which at least supports reception and transmission of the GSM radio-frequency signal, a power amplifier which amplifies signals of respective bands, two high-power filters which are set behind the power amplifier and filter the out-of-band spurious signal, two saw filters which are set at the reception end of the radio-frequency transceiver chip and filter the out-of-band spurious signal, two sets of radio-frequency switches (one of which is used for switching the GSM low-band transceiving path, and the other is used for switching the GSM high-band transceiving path, and each set includes a radio-frequency switch), a diplexer (which is used for synthesis of GSM high band and low band), and an radio-frequency antenna (which is used for transmitting and receiving the GSM signal).

The transceiver chip of the GSM radio-frequency transceiver module can support at least reception and transmission of signals of the GSM900 and DCS1800 bands, and an Analog to Digital Converter (ADC) set in it is used for acquiring and outputting an analog signal. One set of the radio-frequency switch of the GSM radio-frequency transceiver module is used for switching the GSM900 radio-frequency transceiving path, and the other is used for switching the DCS1800 radio-frequency transceiving path; the low-pass filter can be set in the transmission path of the radio-frequency switch. The high-power filter set behind the power amplifier and the filter set behind the radio-frequency switch can be a band pass filter and a low pass filter which have a low insertion loss in an emission band and a high insertion loss at the third harmonic. The filters used can be the same or different.

In the present embodiment, the diplexer has two paths, one of which has the high-pass filtering function, and the other has the low-pass filtering function. There is a low insertion loss in the high-pass path band, which has very high out-of-band rejection to low frequency; and there is a low insertion loss in the low-pass path band, which has very high out-of-band rejection to high frequency.

Figure 6:
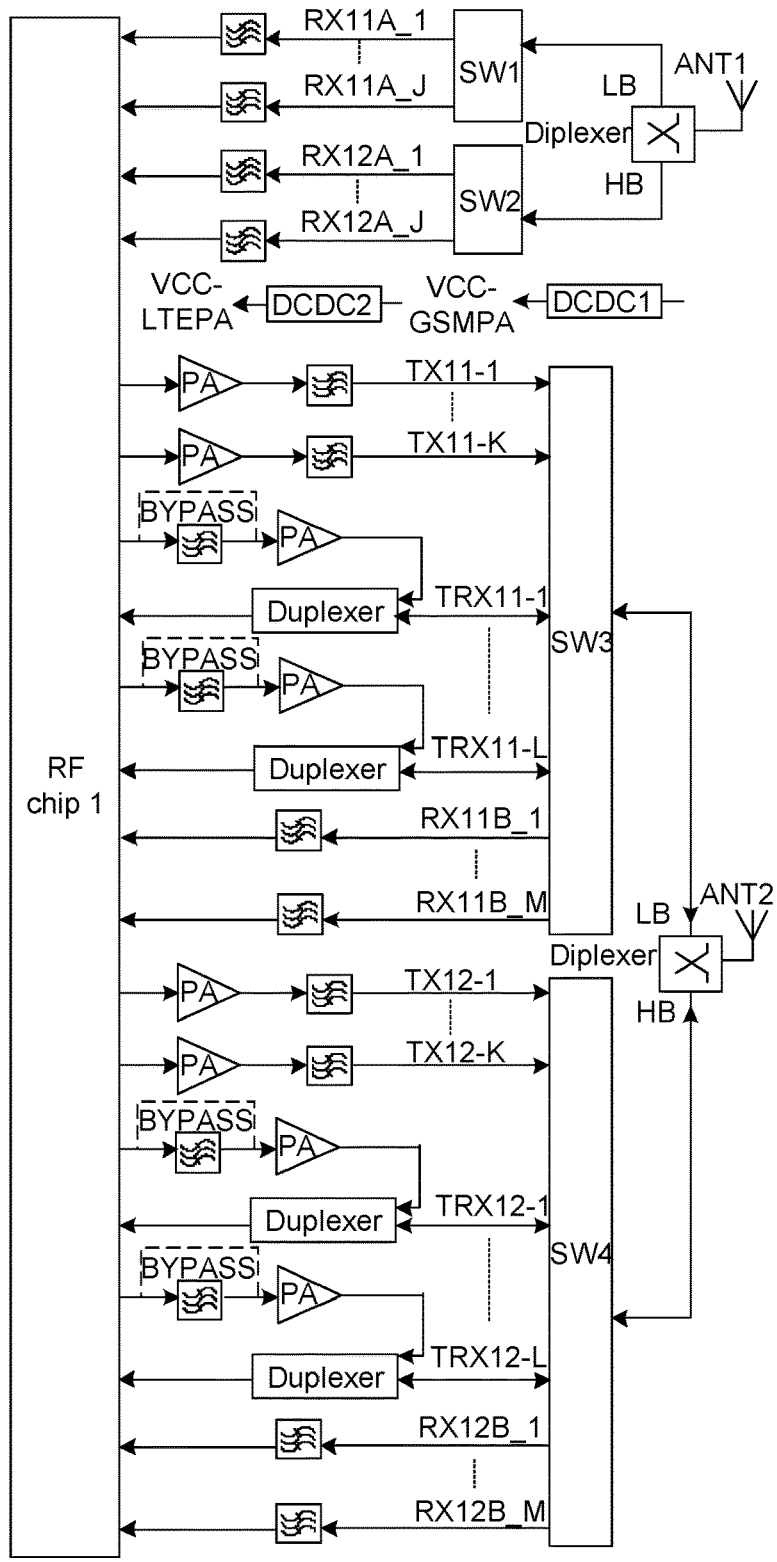
FIG. 6 is a schematic diagram of an LTE radio-frequency front architecture of a multimode dual-active terminal according to an embodiment of the disclosure.

FIG. 6 is a schematic diagram of an LTE radio-frequency front architecture of a multimode dual-active terminal according to an embodiment of the disclosure. As shown in FIG. 6, in the LTE radio-frequency front architecture of the multimode dual-active terminal, paths of respective LTE bands are classified according to the high and low bands; the low-band paths of each mode share a radio-frequency switch, and the high-band paths share a radio-frequency switch. The common interface of the switch of the high-band path is connected to the high-pass interface of the diplexer, the common interface of the switch of the low-band path is connected to the low-pass interface of the diplexer, and the common interface of the diplexer is connected to the radio-frequency antenna. The primary channel and the secondary channel of the LTE are connected based on this principle.

Figure 7:
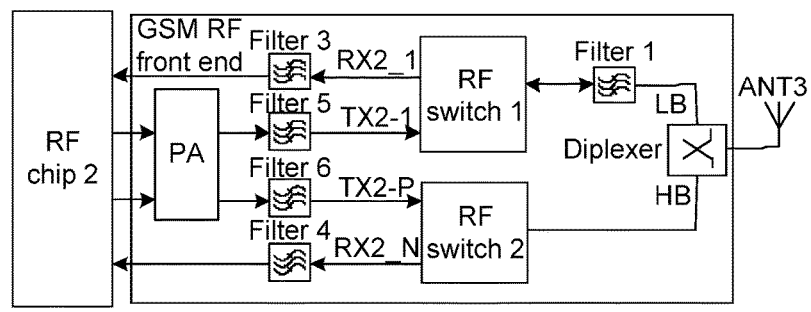
FIG. 7 is a schematic diagram of a GSM radio-frequency front architecture of a multimode dual-active terminal according to an embodiment of the disclosure.
Figure 8:
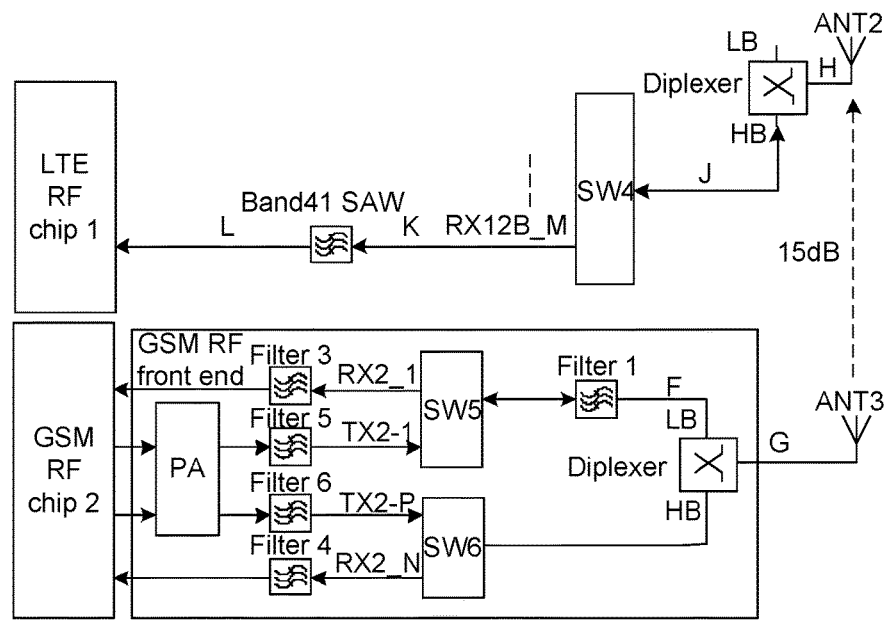
FIG. 8 is a schematic diagram of interference between transmission at GSM900 band and reception at Band 41 according to an embodiment of the disclosure.

FIG. 7 is a schematic diagram of an LTE radio-frequency front architecture of a multimode dual-active terminal according to an embodiment of the disclosure. As shown in FIG. 7, in the GSM radio-frequency front architecture of the multimode dual-active terminal, paths of respective bands of the GSM mode are classified according to the high and low bands; the low-band paths of each mode share a radio-frequency switch, and the high-band paths share a radio-frequency switch. The common interface of the switch of the high-band path is connected to the high-pass interface of the diplexer, the common interface of the switch of the low-band path is connected to the low-pass interface of the diplexer, and the common interface of the diplexer is connected to the radio-frequency antenna. Therefore the interference between the LTE radio-frequency transceiver module and the GSM radio-frequency transceiver module can be reduced.

By means of the multimode dual-active terminal provided by the present embodiment, the interference between transmission at GSM900 band and reception at Band 41 is shown in FIG. 6. At the point F, the power of a GSM useful signal is 33 dBm, and the third-harmonic intensity is about −50 dBm. An in-band insertion loss of the diplexer low-pass path is about 0.5 dB; the loss at 2500-2700 MHz is less than −35 dB; the GSM useful signal power at an antenna interface G is 32.5 dBm, and the third-harmonic intensity is about −85 dBm. The power of the GSM useful signal which is transmitted, via an idle interface, to a reception interface H of the LTE antenna is 17.5 dBm, and the third-harmonic intensity is about −100 dBm. The in-band insertion loss of the diplexer high-pass path is 0.5 dB, the insertion loss in the GSM900 band is about −30 dB, the power of a GSM900 useful signal at the point J is −12.5 dBm, and the third-harmonic intensity is about −100.5 dBm. The power of the GSM900 useful signal, passing an LTE antenna switch, at the point K is −13.5 dBm, and the third-harmonic intensity is about −97.5 dBm. The power of the useful signal of the GSM band which is received at a reception port L of the LTE chip Band 41 is about −53.5 dBm, and the third-harmonic intensity of the GSM band is about −100.5 dBm. So, by adopting the technical solution provided by the disclosure, the interferences of signals from the GSM band and the third harmonic to the reception port of the LTE Band 41 are obviously reduced.

The above is only the preferred embodiment of the disclosure and not intended to limit the disclosure; for those skilled in the art, the disclosure may have various modifications and changes. Any modifications, equivalent replacements, improvements and the like within the spirit and principle of the disclosure shall fall within the scope of the claims of the disclosure.

INDUSTRIAL APPLICABILITY

In the disclosure, paths of respective bands of the radio-frequency module in two dual-active modules of the multimode dual-active terminal are classified according to the high and low bands; the low-band paths share a radio-frequency switch, and the high-band paths share a radio-frequency switch. The technical solution in the related art that paths of all bands of each radio-frequency transceiving module share a radio-frequency switch is not adopted. So the disclosure has the industrial applicability.

What is claimed is:

1. A multimode dual-active terminal, comprising: an antenna group, a first radio-frequency transceiver module which supports reception and transmission of a radio-frequency signal of a first communication mode, a second radio-frequency transceiver module which supports reception and transmission of a radio-frequency signal of a second communication mode, a first radio-frequency switch, a second radio-frequency switch, a third radio-frequency switch, a fourth radio-frequency switch, a fifth radio-frequency switch, and a sixth radio-frequency switch, wherein a high-band transceiving path of a first channel of the first radio-frequency transceiver module is connected with the antenna group via the first radio-frequency switch, and a low-band transceiving path of the first channel of the first radio-frequency transceiver module is connected with the antenna group via the second radio-frequency switch;

wherein a high-band transceiving path of the second radio-frequency transceiver module is connected with the antenna group via the third radio-frequency switch, and a low-band transceiving path of the second radio-frequency transceiver module is connected with the antenna group via the fourth radio-frequency switch; and wherein a high-band transceiving path of a second channel of the first radio-frequency transceiver module is connected with the antenna group via the fifth radio-frequency switch, and a low-band transceiving path of the second channel of the first radio-frequency transceiver module is connected with the antenna group via the sixth radio-frequency switch.

2. The multimode dual-active terminal according to claim 1, wherein the antenna group comprises a first antenna and a second antenna; and the multimode dual-active terminal further comprises a first diplexer and a second diplexer, wherein a common interface of the first radio-frequency switch is connected with a high-pass interface of the first diplexer, a common interface of the second radio-frequency switch is connected with a low-pass interface of the first diplexer, and a common interface of the first diplexer is connected with the first antenna; and wherein a common interface of the third radio-frequency switch is connected with a high-pass interface of the second diplexer, a common interface of the fourth radio-frequency switch is connected with a low-pass interface of the second diplexer, and a common interface of the second diplexer is connected with the second antenna.

3. The multimode dual-active terminal according to claim 2, wherein the antenna group further comprises a third antenna; and the multimode dual-active terminal further comprises a third diplexer, wherein a common interface of the fifth radio-frequency switch is connected with a high-pass interface of the third diplexer, a common interface of the sixth radio-frequency switch is connected with a low-pass interface of the third diplexer, and a common interface of the third diplexer is connected with the third antenna.

4. The multimode dual-active terminal according to claim 3, wherein the first communication mode is an LTE communication mode, and the second communication mode is a GSM communication mode.

5. The multimode dual-active terminal according to claim 4, wherein the first channel is a primary channel, and the second channel is a secondary channel.

6. The multimode dual-active terminal according to claim 4, wherein frequency bands supported by the second radio-frequency transceiver module comprise: GSM900 and DCS1800.

7. The multimode dual-active terminal according to claim 1, wherein the antenna group comprises a first antenna; and the multimode dual-active terminal further comprises a first diplexer, wherein a common interface of the fifth radio-frequency switch is connected with a high-pass interface of the first diplexer, a common interface of the sixth radio-frequency switch is connected with a low-pass interface of the first diplexer, and a common interface of the first diplexer is connected with the first antenna.

8. The multimode dual-active terminal according to claim 7, wherein the first communication mode is a Long Term Evolution (LTE) communication mode, and the second communication mode is a Global System for Mobile Communications (GSM) communication mode.

9. The multimode dual-active terminal according to claim 8, wherein the first channel is a primary channel, and the second channel is a secondary channel.

10. The multimode dual-active terminal according to claim 8, wherein frequency bands supported by the second radio-frequency transceiver module comprise: GSM900 and Digital Cellular System (DCS) 1800.

\* \* \* \* \*